(12) United States Patent
Parandeh Afshar et al.

(10) Patent No.: US 10,846,260 B2
(45) Date of Patent: Nov. 24, 2020

(54) PROVIDING RECONFIGURABLE FUSION OF PROCESSING ELEMENTS (PES) IN VECTOR-PROCESSOR-BASED DEVICES

(71) Applicant: QUALCOMM Incorporated, San Diego, CA (US)

(72) Inventors: Hadi Parandeh Afshar, San Diego, CA (US); Amrit Panda, Redmond, WA (US); Eric Rotenberg, Raleigh, NC (US); Gregory Michael Wright, Chapel Hill, NC (US)

(73) Assignee: Qualcomm Incorporated, San Diego, CA (US)

( * ) Notice: Subject to any disclaimer, the term of this patent is extended or adjusted under 35 U.S.C. 154(b) by 147 days.

(21) Appl. No.: 16/028,072

(22) Filed: Jul. 5, 2018

(65) Prior Publication Data

US 2020/0012618 A1 Jan. 9, 2020

(51) Int. Cl.
*G06F 15/80* (2006.01)
*G06F 9/30* (2018.01)
*G06F 15/78* (2006.01)

(52) U.S. Cl.
CPC ...... *G06F 15/8092* (2013.01); *G06F 9/30036* (2013.01); *G06F 9/30065* (2013.01); *G06F 15/7867* (2013.01); *G06F 15/8076* (2013.01)

(58) Field of Classification Search
CPC ............. G06F 15/8092; G06F 15/7867; G06F 9/30065
See application file for complete search history.

(56) References Cited

U.S. PATENT DOCUMENTS

| 5,274,818 A | 12/1993 | Vasilevsky et al. |
|---|---|---|
| 6,023,742 A | 2/2000 | Ebeling et al. |
| 7,140,019 B2 | 11/2006 | May et al. |
| 8,001,266 B1 * | 8/2011 | Gonzalez ............... G06F 9/544 370/351 |
| 9,292,284 B2 | 3/2016 | Toi et al. |

(Continued)

OTHER PUBLICATIONS

International Search Report and Written Opinion for PCT/US2019/039021, dated Sep. 20, 2019, 15 pages.

*Primary Examiner* — Farley Abad
(74) *Attorney, Agent, or Firm* — Withrow & Terranova, PLLC

(57) ABSTRACT

Providing reconfigurable fusion of processing elements (PEs) in vector-processor-based devices is disclosed. In this regard, a vector-processor-based device provides a vector processor including a plurality of PEs and a decode/control circuit. The decode/control circuit receives an instruction block containing a vectorizable loop comprising a loop body. The decode/control circuit determines how many PEs of the plurality of PEs are required to execute the loop body, and reconfigures the plurality of PEs into one or more fused PEs, each including the determined number of PEs required to execute the loop body. The plurality of PEs, reconfigured into one or more fused PEs, then executes one or more loop iterations of the loop body. Some aspects further include a PE communications link interconnecting the plurality of PEs, to enable communications between PEs of a fused PE and communications of inter-iteration data dependencies between PEs without requiring vector register file access operations.

14 Claims, 7 Drawing Sheets

(56) References Cited

U.S. PATENT DOCUMENTS

| | | | |
|---|---|---|---|
| 9,292,287 B2 | 3/2016 | Lee et al. | |
| 2005/0071835 A1* | 3/2005 | Essick, IV | G06F 9/3001 |
| | | | 717/161 |
| 2009/0282281 A1* | 11/2009 | Bull | G06F 9/3869 |
| | | | 714/2 |
| 2010/0199069 A1* | 8/2010 | Kim | G06F 9/3897 |
| | | | 712/30 |
| 2010/0211760 A1* | 8/2010 | Bernhard | G06F 9/3012 |
| | | | 712/204 |
| 2015/0127933 A1 | 5/2015 | Choi et al. | |
| 2016/0313991 A1 | 10/2016 | Wei et al. | |

* cited by examiner

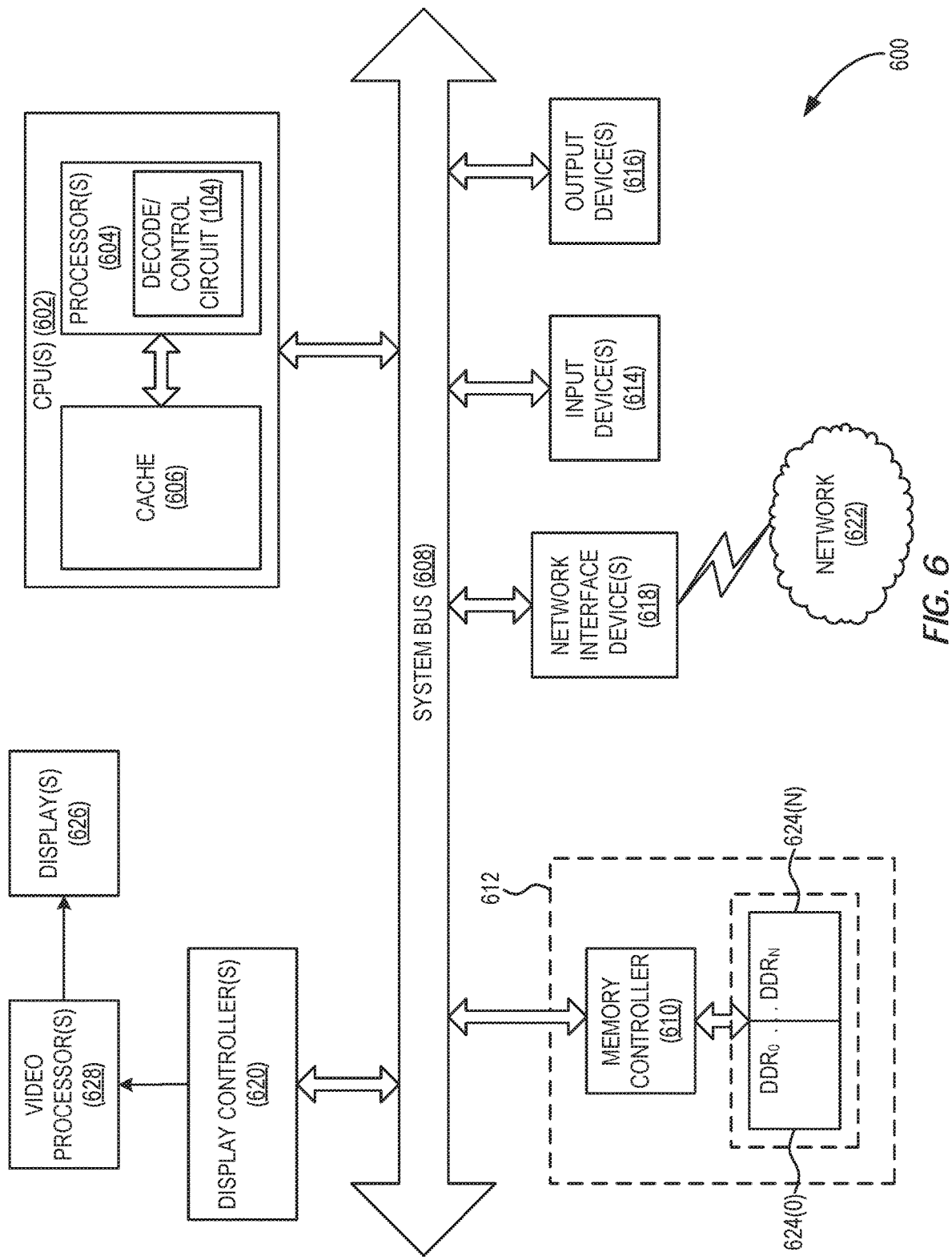

PROVIDING RECONFIGURABLE FUSION OF PROCESSING ELEMENTS (PES) IN VECTOR-PROCESSOR-BASED DEVICES

BACKGROUND

I. Field of the Disclosure

The technology of the disclosure relates generally to vector-processor-based devices, and, in particular, to parallel processing of vectorizable loops using processing elements (PEs) of vector-processor-based devices.

II. Background

Vector-processor-based devices are computing devices that employ vector processors capable of operating on one-dimensional arrays of data ("vectors") using a single program instruction. Conventional vector processors include multiple processing elements (PEs) that are organized into vector lanes, each of which may perform computations in parallel with each other. As non-limiting examples, each of the PEs provided by conventional vector processors may be an in-order processing unit, or may be a reconfigurable fabric such as a coarse-grained reconfigurable array (CGRA) comprising a programmably interconnected group of functional units. Vector-processor-based devices are particularly useful for processing vectorizable loops that involve a high degree of data level parallelism (DLP).

When processing a vectorizable loop, each PE of a vector processor may perform the same task (e.g., executing a same loop body of the vectorizable loop, using different values for an induction variable of the vectorizable loop) in parallel. When processing vectorizable loops using a conventional vector processor having reconfigurable PEs (e.g., a vector processor in which each PE is a CGRA), the performance of the vector processor is heavily dependent on how the loop body of the vectorizable loop is mapped to the PEs. In an ideal scenario, the PEs of the vector processor are configured a single time, and each PE then processes one loop iteration of the vectorizable loop in parallel until all loop iterations have been executed. However, in practice, the mapping of the loop body of the vectorizable loop to the PEs of the vector processor may result in suboptimal performance under some circumstances. For example, if the loop body is too large to be processed by a single PE (e.g., because the loop body requires more operations than can be performed by the number of functional units provided by the PE), each loop iteration of the loop body must be split into multiple loop partitions, and the PEs must be dynamically reconfigured after execution of each loop partition. Splitting each loop iteration in this manner causes the vector processor to incur performance penalties due to the reconfiguration of the PEs as well as the need to communicate results of each loop partition execution via a vector register file. Moreover, if the number of loop iterations is smaller than the number of PEs, a number of otherwise available PEs will go unused. Finally, in the case of a vectorizable loop in which data dependencies exist between loop iterations, the data dependencies must be communicated from one loop iteration to another via the vector register file, which may be computationally expensive.

SUMMARY OF THE DISCLOSURE

Aspects disclosed in the detailed description include providing reconfigurable fusion of processing elements (PEs) in vector-processor-based devices. In this regard, a vector-processor-based device provides a vector processor that includes a plurality of PEs and a decode/control circuit that is configured to group multiple PEs into larger "fused" PEs as needed. Some aspects further include a PE communications link that interconnects the plurality of PEs to enable communications between fused PEs and among PEs comprising a fused PE without requiring vector register file access operations. In exemplary operation, the decode/control circuit receives an instruction block containing a vectorizable loop that comprises a loop body. The decode/control circuit determines how many PEs of the plurality of PEs are required to execute the loop body (e.g., based on comparing a number of instructions within the loop body with a number of functional units provided by each PE). The decode/control circuit then reconfigures the plurality of PEs into one or more fused PEs, each of which includes a determined number of PEs required to execute the loop body. The plurality of PEs, thus reconfigured into one or more fused PEs, then executes one or more loop iterations of the loop body.

In another aspect, a vector-processor-based device providing reconfigurable fusion of PEs is provided. The vector-processor-based device comprises a vector processor that includes a plurality of PEs, wherein each PE of the plurality of PEs comprises a plurality of heterogeneous functional units. The vector-processor-based device further comprises a decode/control circuit. The decode/control circuit is configured to receive an instruction block containing a vectorizable loop comprising a loop body. The decode/control circuit is further configured to determine a required PE number indicating a number of PEs of the plurality of PEs required to execute the loop body. The decode/control circuit is also configured to reconfigure the plurality of PEs into one or more fused PEs, wherein each fused PE of the one or more fused PEs comprises the required PE number of PEs of the plurality of PEs. The plurality of PEs are configured to execute one or more loop iterations of the loop body as the one or more fused PEs.

In another aspect, a vector-processor-based device providing reconfigurable fusion of PEs is provided. The vector-processor-based device comprises a means for receiving an instruction block containing a vectorizable loop comprising a loop body. The vector-processor-based device further comprises a means for determining a required PE number indicating a number of PEs of a plurality of PEs of a vector processor required to execute the loop body. The vector-processor-based device also comprises a means for reconfiguring the plurality of PEs into one or more fused PEs, wherein each fused PE of the one or more fused PEs comprises the required PE number of PEs of the plurality of PEs. The vector-processor-based device also comprises a means for executing one or more loop iterations of the loop body using the one or more fused PEs.

In another aspect, a method for providing reconfigurable fusion of PEs of a vector processor is provided. The method comprises receiving, by a decode/control circuit of the vector processor, an instruction block containing a vectorizable loop comprising a loop body. The method further comprises determining a required PE number indicating a number of PEs of a plurality of PEs of the vector processor required to execute the loop body, wherein each PE of the plurality of PEs comprises a plurality of heterogeneous functional units. The method also comprises reconfiguring the plurality of PEs into one or more fused PEs, wherein each fused PE of the one or more fused PEs comprises the required PE number of PEs of the plurality of PEs. The method additionally comprises executing one or more loop iterations of the loop body as the one or more fused PEs.

In another aspect, a non-transitory computer-readable medium is provided, having stored thereon computer-executable instructions for causing a vector processor of a vector-processor-based device to receive an instruction block containing a vectorizable loop comprising a loop body. The computer-executable instructions further cause the vector processor to determine a required PE number indicating a number of PEs of a plurality of PEs of the vector processor required to execute the loop body, wherein each PE of the plurality of PEs comprises a plurality of heterogeneous functional units. The computer-executable instructions also cause the vector processor to reconfigure the plurality of PEs into one or more fused PEs, wherein each fused PE of the one or more fused PEs comprises the required PE number of PEs of the plurality of PEs. The computer-executable instructions additionally cause the vector processor to execute one or more loop iterations of the loop body as the one or more fused PEs.

BRIEF DESCRIPTION OF THE FIGURES

FIG. 6 is a block diagram of an exemplary processor-based system that can include the vector-processor-based device of FIG. 1.

DETAILED DESCRIPTION

Figure 1:
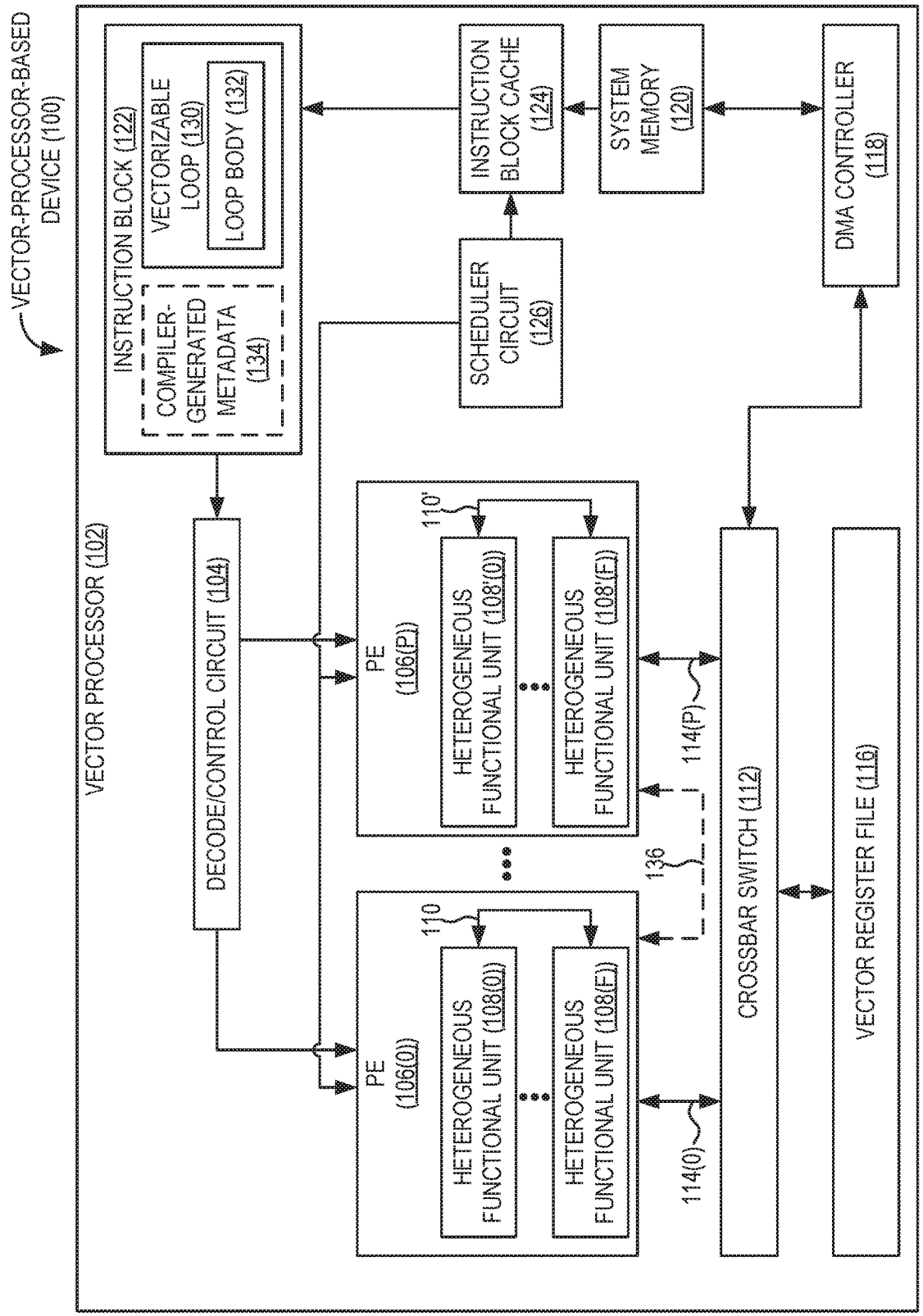
FIG. 1 is a block diagram illustrating a vector-processor-based device configured to provide reconfigurable fusion of processing elements (PEs)

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include providing reconfigurable fusion of processing elements (PEs) in vector-processor-based devices. In this regard, FIG. 1 illustrates a vector-processor-based device 100 that implements a block-based dataflow instruction set architecture (ISA), and that provides a vector processor 102 comprising a decode/control circuit 104. The vector processor 102 includes a plurality of PEs 106(0)-106(P), each of which may comprise a coarse-grained reconfigurable array (CGRA), an in-order processing unit, or a superscalar processor, as non-limiting examples. Each of the PEs 106(0)-106(P) comprises a plurality of heterogeneous functional units 108(0)-108(F), 108'(0)-108'(F) that are programmably interconnected by functional unit communications links 110, 110'. The functional unit communications links 110, 110' serve as private communications paths within each corresponding PE of the plurality of PEs 106(0)-106(P), and are configured to exchange data among the heterogeneous functional units 108(0)-108(F), 108'(0)-108'(F) comprising each PE of the plurality of PEs 106(0)-106(P) during instruction execution. The decode/control circuit 104 may programmably reconfigure the interconnections provided by the functional unit communications links 110, 110' depending on the processing requirements of the instructions to be executed by each of the corresponding PEs 106(0)-106(P). It is to be understood that the vector-processor-based device 100 may include more or fewer vector processors than the vector processor 102 illustrated in FIG. 1, and/or may provide more or fewer PEs (each having more or fewer heterogeneous functional units 108(0)-108(F), 108'(0)-108'(F)) than the PEs 106(0)-106(P) illustrated in FIG. 1.

In the example of FIG. 1, the PEs 106(0)-106(P) are each communicatively coupled bi-directionally to a crossbar switch 112 via channels 114(0)-114(P), through which data (e.g., results of executing a loop iteration of a vectorizable loop) may be read from and written to a vector register file 116. The crossbar switch 112 in the example of FIG. 1 is communicatively coupled to a direct memory access (DMA) controller 118, which is configured to perform memory access operations to read data from and write data to a system memory 120. The DMA controller 118 of FIG. 1 is also configured to control the crossbar switch 112 to exchange data between the vector register file 116, the system memory 120, and the PEs 106(0)-106(P), and store and retrieve vectors and vector elements in the vector register file 116. The system memory 120 according to some aspects may comprise a double-data-rate (DDR) memory, as a non-limiting example.

In exemplary operation, dataflow instruction blocks, such as an instruction block 122, are fetched from the system memory 120, and may be cached in an instruction block cache 124 to reduce the memory access latency associated with fetching frequently accessed instruction blocks. The instruction block 122 is decoded by the decode/control circuit 104, and decoded instructions are assigned to a PE of the plurality of PEs 106(0)-106(P) by a scheduler circuit 126 for execution. To facilitate execution, the PEs 106(0)-106(P) may receive live-in data values from the vector register file 116 as input, and, following execution of instructions, may write live-out data values as output to the vector register file 116.

It is to be understood that the vector-processor-based device 100 of FIG. 1 may include more or fewer elements than illustrated in FIG. 1. The vector-processor-based device 100 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

One application for which the vector-processor-based device 100 may be well-suited is processing vectorizable loops. For instance, in FIG. 1, the instruction block 122 contains a vectorizable loop 130 comprising a loop body 132. To process the loop body 132, the decode/control circuit 104 maps each loop iteration of the loop body 132 to a different PE of the plurality of PEs 106(0)-106(P), which then execute the loop iterations in parallel. However, as noted above, the resulting performance of the vector processor 102 when processing the loop body 132 may depend in large part on how loop iterations of the loop body 132 are mapped to the PEs 106(0)-106(P). For example, if the loop body 132 is too large to be processed by a single PE of the plurality of PEs 106(0)-106(P), each loop iteration of the loop body 132 must be split into multiple loop partitions, and the PEs 106(0)-106(P) must be dynamically reconfigured after execution of each loop partition. This may result in performance penalties due to the reconfiguration of the PEs 106(0)-106(P) as well as the need to communicate intermediate results for each loop partition execution and/or data dependencies between loop iterations via the vector register file 116.

Accordingly, in this regard, the decode/control circuit 104 of FIG. 1 is configured to aggregate multiple ones of the PEs 106(0)-106(P) into larger "fused" PEs. Upon receiving the instruction block 122, the decode/control circuit 104 determines how many PEs of the plurality of PEs 106(0)-106(P) are required to execute the loop body 132 of the vectorizable loop 130. This number is referred to herein as a "required PE number," and may be determined based on, e.g., a comparison of a number of instructions within the loop body 132 with a number of the heterogeneous functional units 108(0)-108(F), 108'(0)-108'(F) provided by each of the PEs 106(0)-106(P). In some aspects, information regarding the instructions within the loop body 132 may be obtained by the decode/control circuit 104 from compiler-generated metadata 134 provided as part of the instruction block 122 (e.g., as part of an instruction block header, as a non-limiting example). The decode/control circuit 104 reconfigures the plurality of PEs 106(0)-106(P) into one or more fused PEs (not shown), each of which includes the required PE number of the PEs 106(0)-106(P) needed to execute the loop body 132. The plurality of PEs 106(0)-106(P), reconfigured into the one or more fused PEs, then execute one or more loop iterations of the loop body 132. In use cases in which the plurality of PEs 106(0)-106(P) are reconfigured into a plurality of fused PEs, each of the fused PEs may execute one loop iteration of the loop body 132 in parallel with other fused PEs of the plurality of fused PEs. If there are more loop iterations than fused PEs, the decode/control circuit 104 may perform loop unrolling, such that each fused PE executes a plurality of loop iterations of the loop body 132.

Some aspects of the vector processor 102 further provide additional linkages between the PEs 106(0)-106(P) to improve system performance both when the PEs 106(0)-106(P) are operating as fused PEs, as well as when the PEs 106(0)-106(P) are operating in a non-fused mode. In particular, the vector processor 102 in the example of FIG. 1 may include a PE communications link 136 that interconnects the PEs 106(0)-106(P). When the PEs 106(0)-106(P) are operating in a conventional non-fused mode, the PE communications link 136 enables data dependencies between loop iterations (e.g., when processing vectorizable loops with reduction operations and/or vectorizable loops with carried dependence, as non-limiting examples) to be communicated between the PEs 106(0)-106(P) without requiring access to the vector register file 116. When the PEs 106(0)-106(P) are operating as fused PEs, the PE communications link 136 communicates inter-iteration data dependencies among the fused PEs, and also facilitates communications among the heterogeneous functional units 108(0)-108(F), 108'(0)-108'(F) within the different PEs 106(0)-106(P) that make up each fused PE. Because the functional unit communications links 110, 110' are private to a given PE 106(0)-106(P), the PE communications link 136 may effectively act as a data path among the heterogeneous functional units 108(0)-108(F), 108'(0)-108'(F) that are pooled to make up each fused PE.

Figure 2:
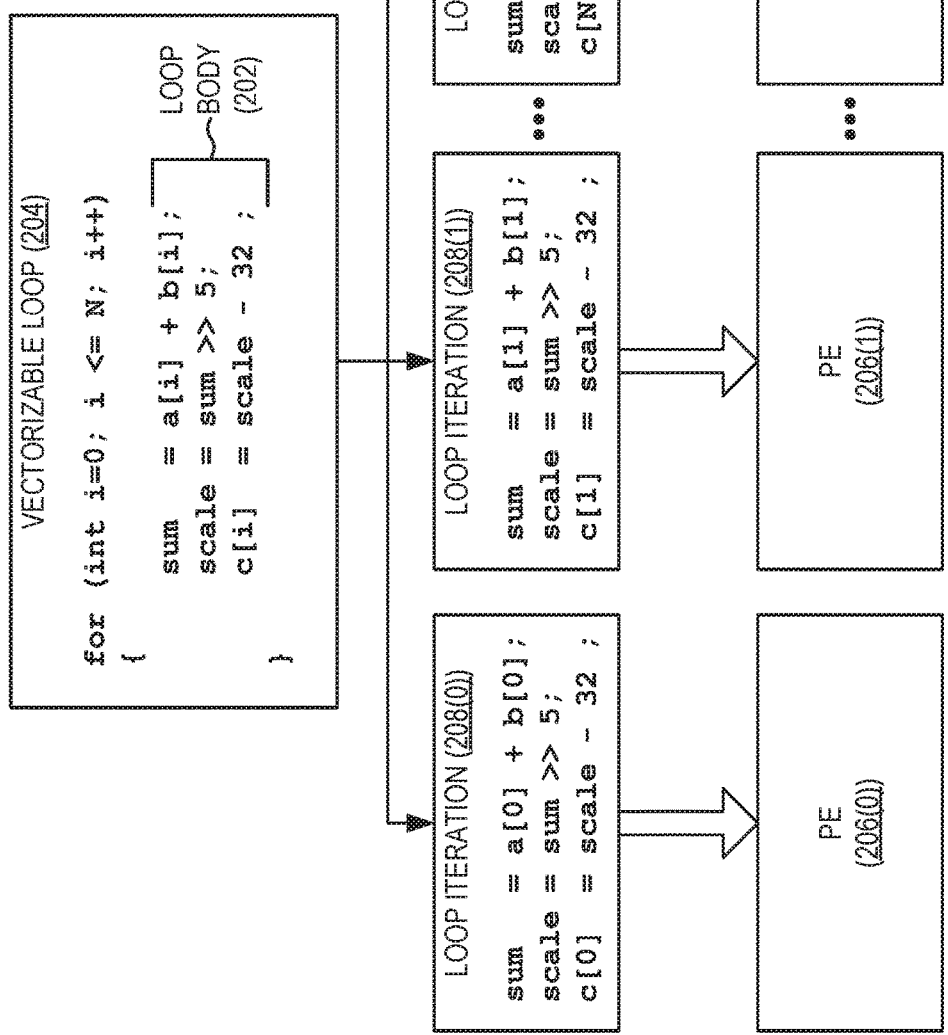
FIG. 2 is a block diagram illustrating an exemplary mapping of a loop body to a plurality of conventional PEs, in which the loop body fits into a single PE.
Figure 3:
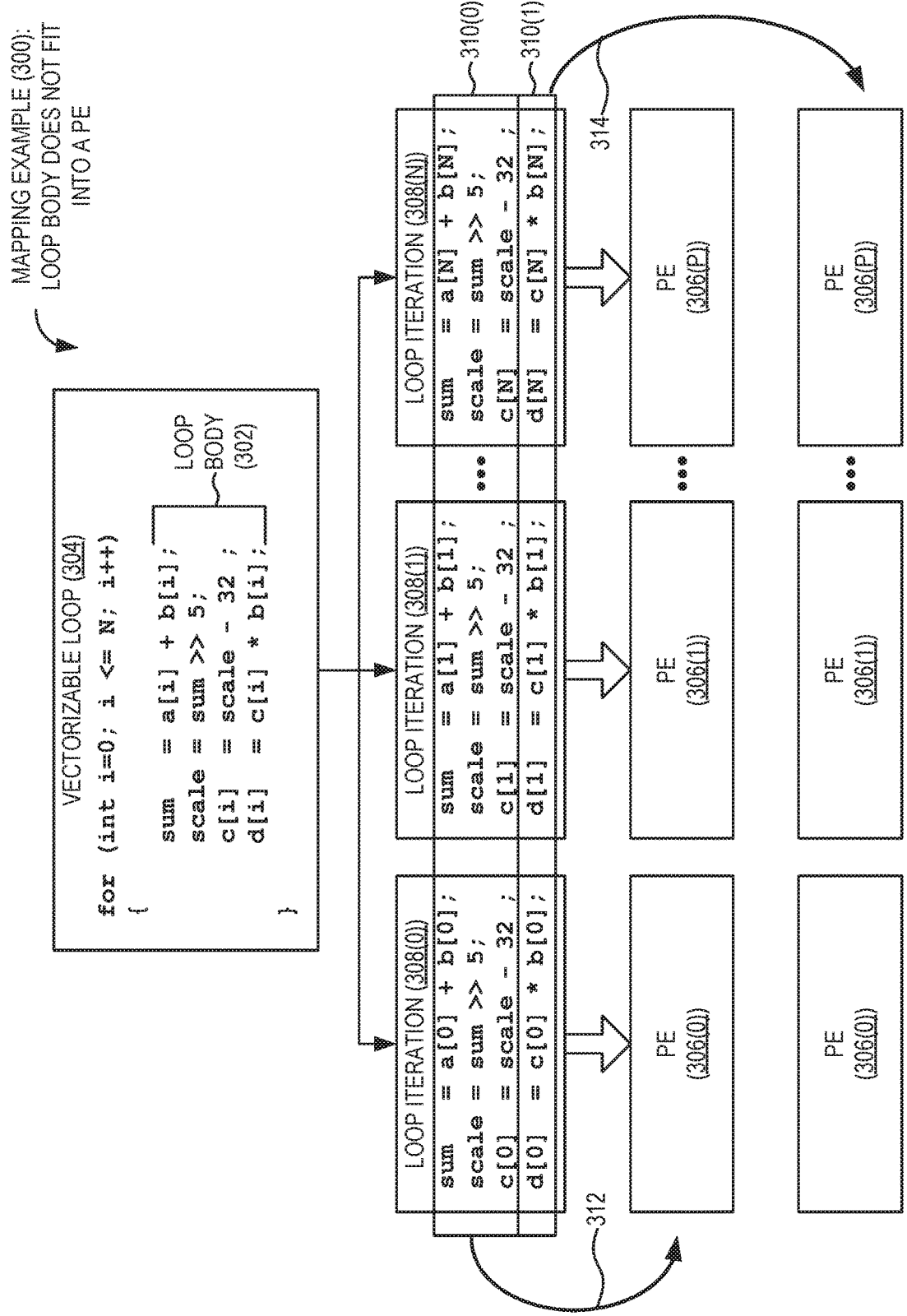
FIG. 3 is a block diagram illustrating an exemplary mapping of a loop body to a plurality of conventional PEs, in which the loop body does not fit into a single PE.

To illustrate in greater detail how the mapping of loop bodies (such as the loop body 132) to PEs 206(0)-206(P) may negatively impact performance of a conventional vector-processor-based device, FIGS. 2 and 3 are provided. FIG. 2 illustrates an example 200 in which a loop body 202 of a vectorizable loop 204 fits within each PE of a plurality of conventional PEs 206(0)-206(P). As seen in FIG. 2, the vectorizable loop 204 is a "for" loop in which an induction variable i begins with an initial value of zero (0), and then is incremented with each loop iteration until it reaches a value specified by a number N. For each loop iteration of the vectorizable loop 204, the instructions contained within the loop body 202 (i.e., an addition instruction, a shift instruction, and a subtraction instruction) are executed using a current value of the induction variable i for the loop iteration. Accordingly, to execute the vectorizable loop 204, loop iterations 208(0)-208(N) of the loop body 202 are assigned to corresponding PEs 206(0)-206(P), with each of the loop iterations 208(0)-208(N) using a different value of the induction variable i. Note that it is assumed in the example of FIG. 2 that the number N is less than or equal to the number P of the PEs 206(0)-206(P), and further that each PE of the plurality of PEs 206(0)-206(P) includes a sufficient number of heterogeneous functional units to execute the instructions within the loop body 202. In this manner, the PEs 206(0)-206(P) are able to execute all of the loop iterations 208(0)-208(N) in parallel for all values of the induction variable i of the loop body 202, resulting in optimal performance.

In contrast, FIG. 3 illustrates an example 300 in which a loop body 302 of a vectorizable loop 304 does not fit into each PE of a plurality of conventional PEs 306(0)-306(P). As seen in FIG. 3, the loop body 302 is similar to the loop body 202 of FIG. 2, except the loop body 302 includes an additional multiplication instruction. The loop body 302 thus requires more operations than can be executed by each PE of the plurality of PEs 306(0)-306(P). Consequently, to execute loop iterations 308(0)-308(N), the loop iterations 308(0)-308(N) are split into two (2) loop partitions 310(0), 310(1) for processing.

During execution, the PEs 306(0)-306(P) are first configured to execute the first loop partition 310(0), as indicated by arrow 312. The PEs 306(0)-306(P) are then reconfigured to execute the second loop partition 310(1), as indicated by arrow 314. If the number N of loop iterations 308(0)-308(N) is greater than the number P of the PEs 306(0)-306(P), then the PEs 306(0)-306(P) must be repeatedly reconfigured during execution, which may incur a significant performance penalty. Moreover, any data dependencies and/or intermediate results generated during execution of the loop partitions 310(0), 310(1) must be stored and retrieved by the PEs 306(0)-306(P) using a vector register file such as the vector register file 116 of FIG. 1, which incurs an additional performance penalty.

Figure 4:
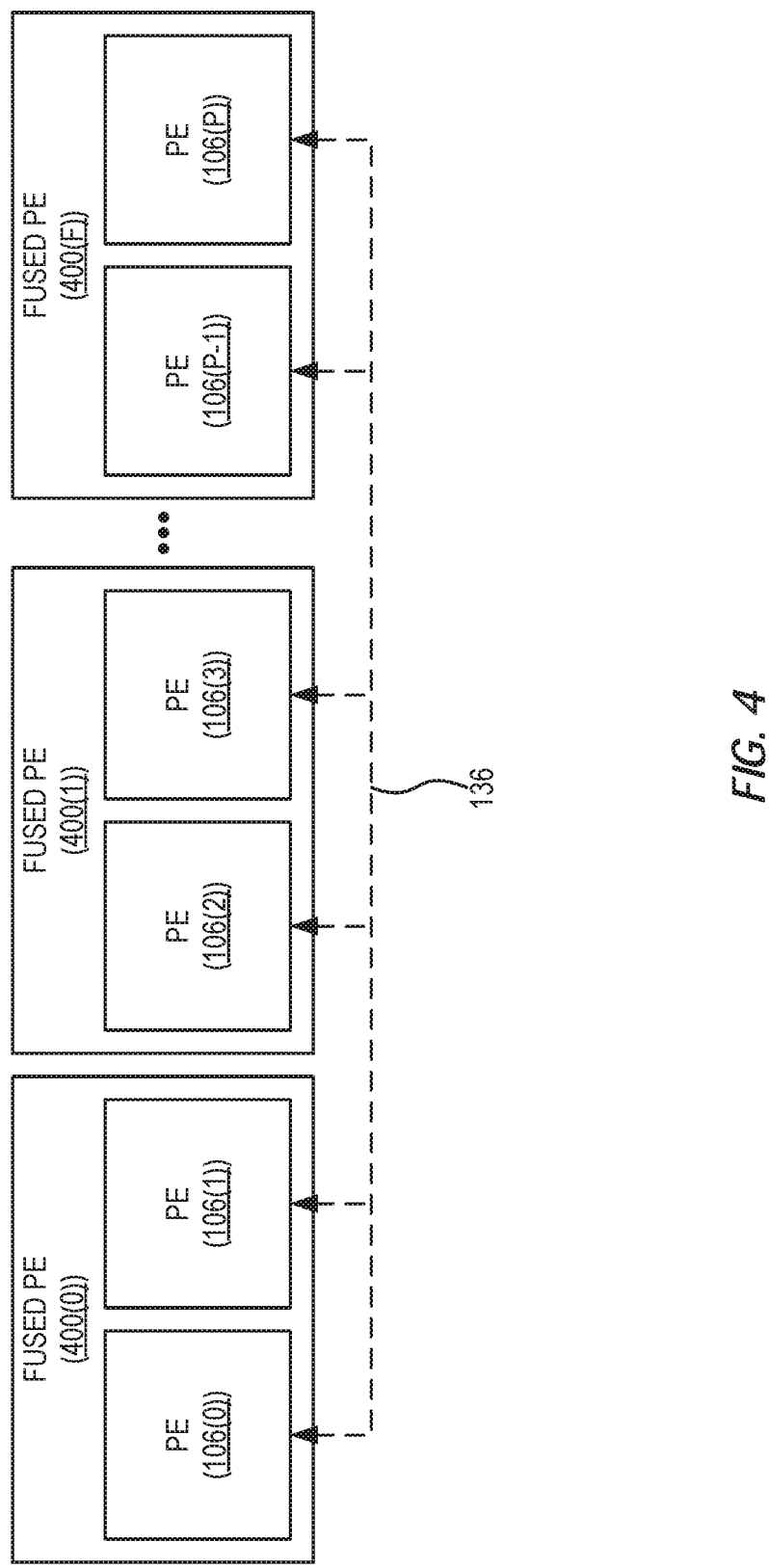
FIG. 4 is a block diagram illustrating how the PEs provided by the vector-processor-based device of FIG. 1 may be reconfigured into fused PEs.

FIG. 4 is a block diagram illustrating how the PEs 106(0)-106(P) provided by the vector-processor-based device 100 of FIG. 1 may be reconfigured into one or more fused PEs by the decode/control circuit 104 of FIG. 1 to address the scenario illustrated by FIG. 3. In the example of FIG. 4, the PEs 106(0)-106(P) have been organized into a plurality of fused PEs 400(0)-400(F), with each fused PE of the plurality of fused PEs 400(0)-400(F) comprising two (2) of the PEs 106(0)-106(P). Thus, the fused PE 400(0) includes the PEs 106(0), 106(1), while the fused PE 400(1) includes the PEs 106(2), 106(3), and so on in similar fashion, with each pair of the PEs 106(0)-106(P) configured to interact and operate as a single fused PE. As shown in FIG. 4, communications among the PEs 106(0)-106(P)

constituting the fused PEs 400(0)-400(F) may be further facilitated in some aspects by the PE communications link 136.

It is to be understood that the decode/control circuit 104 may reconfigure the PEs 106(0)-106(P) into arrangements of fused PEs 400(0)-400(F) other than the arrangement illustrated in FIG. 4. For example, the decode/control circuit 104 may reconfigure more of the PEs 106(0)-106(P) into each fused PE of the fused PEs 400(0)-400(F) as needed in order to better balance instruction-level parallelism (ILP) with data-level parallelism (DLP) for particular applications. In extreme cases requiring maximum ILP, the decode/control circuit 104 may even reconfigure all of the PEs 106(0)-106(P) into a single fused PE 400.

Figure 5A:
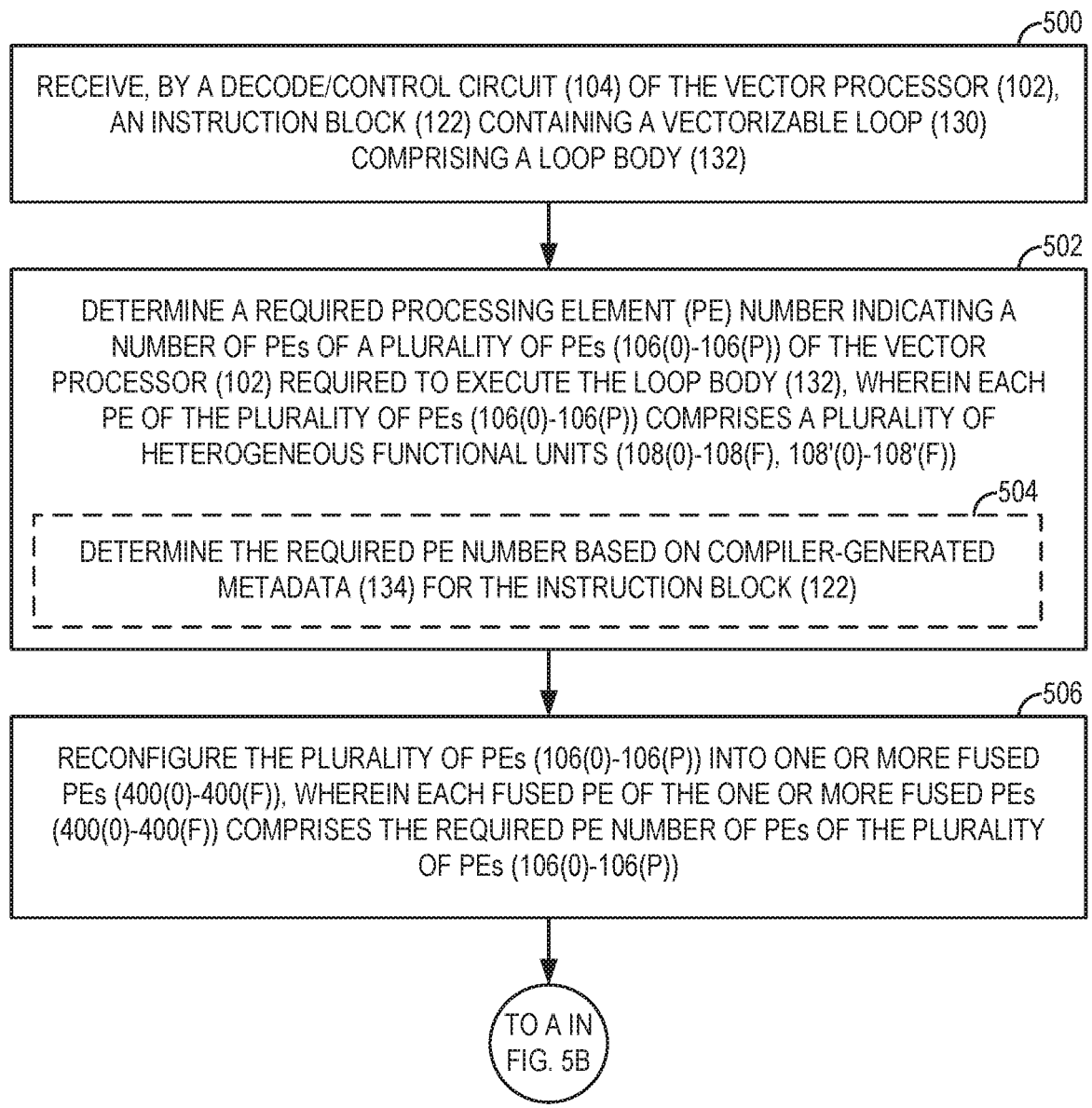
FIGS. 5A and 5B are flowcharts illustrating exemplary operations performed by the vector-processor-based device of FIG. 1 for providing reconfigurable fusion of PEs.

To illustrate exemplary operations for reconfigurable fusion of PEs 106(0)-106(P) in the vector-processor-based device 100 of FIG. 1, FIG. 5 is provided. For the sake of clarity, elements of FIGS. 1 and 4 are referenced in describing FIG. 5. Operations in FIG. 5 begin with the decode/control circuit 104 of the vector processor 102 receiving the instruction block 122 containing the vectorizable loop 130 comprising the loop body 132 (block 500). In this regard, the decode/control circuit 104 may be referred to herein as "a means for receiving an instruction block containing a vectorizable loop comprising a loop body." The decode/control circuit 104 determines a required PE number indicating a number of PEs of the plurality of PEs 106(0)-106(P) of the vector processor 102 required to execute the loop body 132, wherein each PE of the plurality of PEs 106(0)-106(P) comprises a plurality of heterogeneous functional units 108(0)-108(F), 108'(0)-108'(F) (block 502). Accordingly, the decode/control circuit 104 may be referred to herein as "a means for determining a PE number indicating a number of PEs of a plurality of PEs of a vector processor required to execute the loop body." In some aspects, operations of block 502 for determining the required PE number may comprise determining the required PE number based on the compiler-generated metadata 134 for the instruction block 122 (block 504).

The decode/control circuit 104 then reconfigures the plurality of PEs 106(0)-106(P) into one or more fused PEs 400(0)-400(F), wherein each fused PE of the one or more fused PEs 400(0)-400(F) comprises the required PE number of PEs of the plurality of PEs 106(0)-106(P) (block 506). The decode/control circuit 104 thus may be referred to herein as "a means for reconfiguring the plurality of PEs into one or more fused PEs, wherein each fused PE of the one or more fused PEs comprises the required PE number of PEs of the plurality of PEs." Processing then continues at block 508 of FIG. 5B.

Figure 5B:
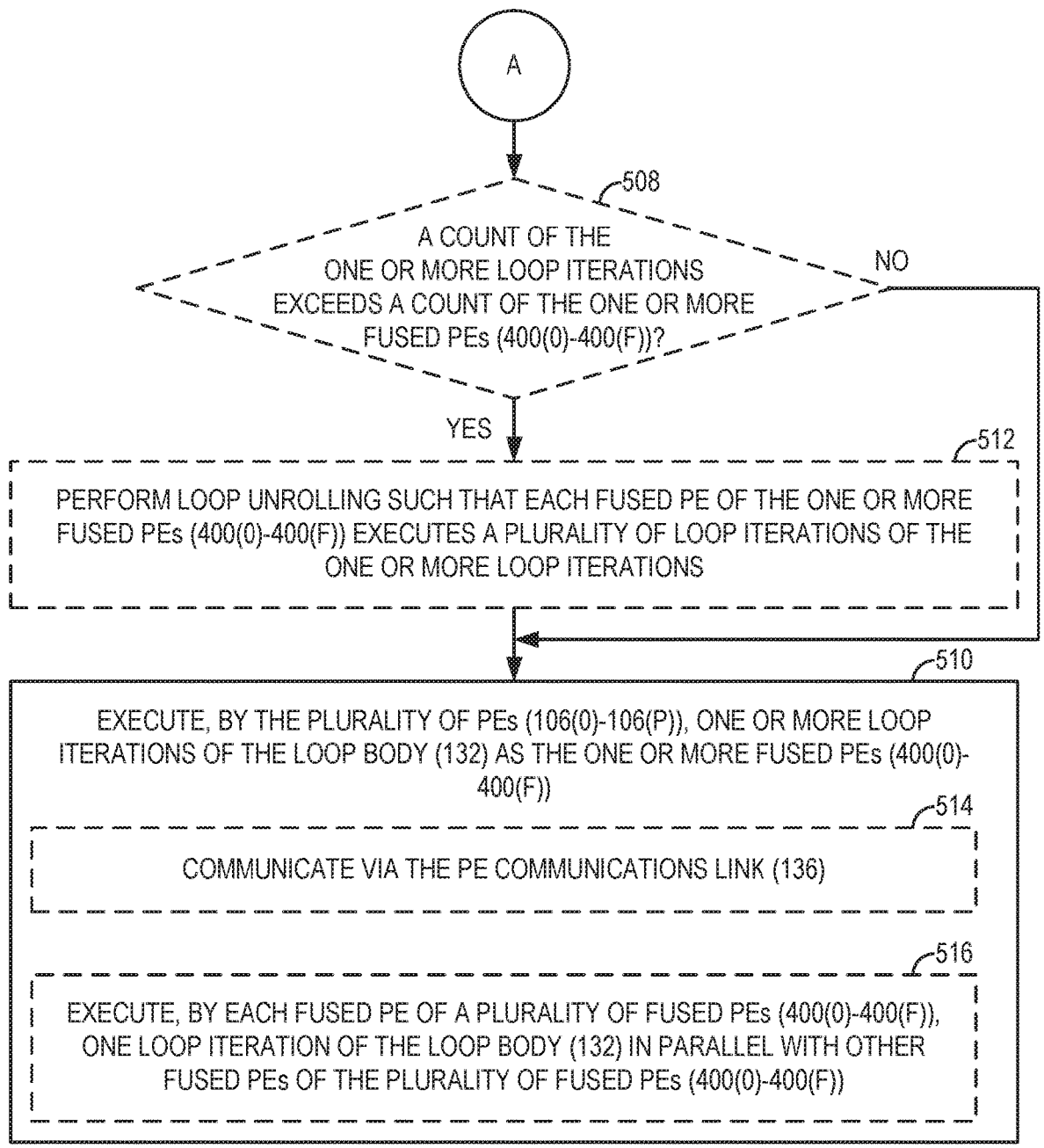

Referring now to FIG. 5B, in some aspects, the decode/control circuit 104 may determine whether a count of one or more loop iterations to be performed exceeds a count of the one or more fused PEs 400(0)-400(F) (block 508). If not, processing resumes at block 510. However, if it is determined at decision block 508 that the count of the one or more loop iterations to be performed does exceed the count of the one or more fused PEs 400(0)-400(F), the decode/control circuit 104 may perform loop unrolling such that each fused PE of the one or more fused PEs 400(0)-400(F) executes a plurality of loop iterations of the one or more loop iterations (block 512). Processing then resumes at block 510.

The PEs 106(0)-106(P) then execute one or more loop iterations of the loop body 132 as the one or more fused PEs 400(0)-400(F) (block 510). In this regard, the plurality of PEs 106(0)-106(P) may be referred to herein as "a means for executing one or more loop iterations of the loop body using the one or more fused PEs." In some aspects, operations of block 510 for executing the one or more loop iterations of the loop body 132 as the one or more fused PEs 400(0)-400(F) may comprise the PEs 106(0)-106(P) of each of the one or more fused PEs 400(0)-400(F) communicating via the PE communications link 136 (block 514). Some aspects in which the one or more fused PEs 400(0)-400(F) comprise a plurality of fused PEs 400(0)-400(F) may provide that operations of block 510 for executing the one or more loop iterations of the loop body 132 as the one or more fused PEs 400(0)-400(F) may comprise executing, by each fused PE of the plurality of fused PEs 400(0)-400(F), one loop iteration of the loop body 132 in parallel with other fused PEs of the plurality of fused PEs 400(0)-400(F) (block 516).

Providing reconfigurable fusion of PEs in vector-processor-based devices according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

In this regard, FIG. 6 illustrates an example of a processor-based system 600 that may correspond to the vector-processor-based device 100 of FIG. 1. The processor-based system 600 includes one or more central processing units (CPUs) 602, each including one or more processors 604 (which in some aspects may correspond to the PEs 106(0)-106(P) of FIG. 1) comprising the decode/control circuit 104 of FIG. 1. The CPU(s) 602 may have cache memory 606 coupled to the processor(s) 604 for rapid access to temporarily stored data. The CPU(s) 602 is coupled to a system bus 608 and can intercouple master and slave devices included in the processor-based system 600. As is well known, the CPU(s) 602 communicates with these other devices by exchanging address, control, and data information over the system bus 608. For example, the CPU(s) 602 can communicate bus transaction requests to a memory controller 610 as an example of a slave device.

Other master and slave devices can be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including but not limited to input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include one or more memory units 624(0)-624(N).

The CPU(s) 602 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A vector-processor-based device providing reconfigurable fusion of processing elements (PEs), comprising a vector processor comprising:
    a plurality of PEs, wherein each PE of the plurality of PEs comprises a plurality of heterogeneous functional units; and
    a decode/control circuit configured to:
        receive an instruction block containing a vectorizable loop comprising a loop body;
        determine a required PE number indicating a number of PEs of the plurality of PEs required to execute the loop body based on a comparison of a number of instructions within the loop body with a number of the plurality of heterogeneous functional units provided by each PE of the plurality of PEs;
        reconfigure the plurality of PEs into a plurality of fused PEs, wherein each fused PE of the plurality of fused PEs comprises the required PE number of PEs of the plurality of PEs;
        determine that the loop body comprises more loop iterations than a number of fused PEs among the plurality of fused PEs; and
        responsive to determining that the loop body comprises more loop iterations than a number of fused PEs among the plurality of fused PEs, perform loop unrolling such that a fused PE among the plurality of fused PEs executes a plurality of loop iterations of the loop body;
    wherein each fused PE among the plurality of fused PEs is configured to execute a loop iteration of the loop body in parallel with other fused PEs of the plurality of fused PEs executing a loop iteration of the loop body.

2. The vector-processor-based device of claim 1, wherein:
    each fused PE of the plurality of fused PEs is interconnected via a PE communications link; and each fused PE of the plurality of fused PEs is configured to execute the loop iteration of the loop body by being further configured to communicate via the PE communications link.

3. The vector-processor-based device of claim 1, wherein each PE of the plurality of PEs comprises one of a coarse-grained reconfigurable array (CGRA), an in-order processing unit, and a superscalar processor.

4. The vector-processor-based device of claim 1, wherein the decode/control circuit is configured to determine the required PE number based on compiler-generated metadata for the instruction block.

5. The vector-processor-based device of claim 1 integrated into an integrated circuit (IC).

6. The vector-processor-based device of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

7. A vector-processor-based device providing reconfigurable fusion of processing elements (PEs), comprising:
   a means for receiving an instruction block containing a vectorizable loop comprising a loop body;
   a means for determining a required PE number indicating a number of PEs of a plurality of PEs of a vector processor required to execute the loop body based on a comparison of a number of instructions within the loop body with a number of a plurality of heterogeneous functional units provided by each PE of the plurality of PEs;
   a means for reconfiguring the plurality of PEs into a plurality of fused PEs, wherein each fused PE of the plurality of fused PEs comprises the required PE number of PEs of the plurality of PEs and is configured to execute a loop iteration of the loop body in parallel with other fused PEs of the plurality of used PEs executing a loop iteration of the loop body;
   a means for determining that the loop body comprises more loop iterations than a number of fused PEs among the plurality of fused PEs; and
   a means for performing loop unrolling such that a fused PE among the plurality of fused PEs executes a plurality of loop iterations of the loop body, responsive to determining that the loop body comprises more loop iterations than a number of fused PEs among the plurality of fused PEs.

8. A method for providing reconfigurable fusion of processing elements (PEs) of a vector processor, the method comprising:
   receiving, by a decode/control circuit of the vector processor, an instruction block containing a vectorizable loop comprising a loop body;
   determining a required PE number indicating a number of PEs of a plurality of PEs of the vector processor required to execute the loop body, wherein:
   each PE of the plurality of PEs comprises a plurality of heterogeneous functional units; and
   determining the required PE number is based on a comparison of a number of instructions within the loop body with a number of the plurality of heterogeneous functional units provided by each PE of the plurality of PEs;
   reconfiguring the plurality of PEs into a plurality of fused PEs, wherein each fused PE of the plurality of fused PEs comprises the required PE number of PEs of the plurality of PEs;
   executing, by each fused PE among the plurality of fused PEs, a loop iteration of the loop body in parallel with other fused PEs of the plurality of fused PEs executing a loop iteration of the loop body;
   determining that the loop body comprises more loop iterations than a number of fused PEs among the plurality of fused PEs; and
   responsive to determining that the loop body comprises more loop iterations than a number of fused PEs among the plurality of fused PEs, performing loop unrolling such that a fused PE among the plurality of fused PEs executes a plurality of loop iterations of the loop body.

9. The method of claim 8, wherein:
   each fused PE of the plurality of fused PEs is interconnected via a PE communications link; and
   executing the loop iteration of the loop body comprises communicating via the PE communications link.

10. The method of claim 8, wherein each PE of the plurality of PEs comprises one of a coarse-grained reconfigurable array (CGRA), an in-order processing unit, and a superscalar processor.

11. The method of claim 8, wherein determining the required PE number is based on compiler-generated metadata for the instruction block.

12. A non-transitory computer-readable medium, having stored thereon computer-executable instructions for causing a vector processor of a vector-processor-based device to:
   receive an instruction block containing a vectorizable loop comprising a loop body;
   determine a required processing element (PE) number indicating a number of PEs of a plurality of PEs of the vector processor required to execute the loop body, wherein:
   each PE of the plurality of PEs comprises a plurality of heterogeneous functional units; and
   determining the required PE number is based on a comparison of a number of instructions within the loop body with a number of the plurality of heterogeneous functional units provided by each PE of the plurality of PEs;
   reconfigure the plurality of PEs into a plurality of fused PEs, wherein each fused PE of the plurality of fused PEs comprises the required PE number of PEs of the plurality of PEs;
   execute, by each fused PE among the plurality of fused PEs, a loop iteration of the loop body in parallel with other fused PEs of the plurality of fused PEs executing a loop iteration of the loop body;
   determine that the loop body comprises more loop iterations than a number of fused PEs among the plurality of fused PEs; and
   responsive to determining that the loop body comprises more loop iterations than a number of fused PEs among the plurality of fused PEs, perform loop unrolling such that a fused PE among the plurality of fused PEs executes a plurality of loop iterations of the loop body.

13. The non-transitory computer-readable medium of claim 12, wherein the computer-executable instructions for causing the vector processor of the vector-processor-based device to execute the loop iteration of the loop body comprise computer-executable instructions for causing the vector processor to communicate via a PE communications link.

14. The non-transitory computer-readable medium of claim 12, wherein the computer-executable instructions for causing the vector processor of the vector-processor-based device to determine the required PE number comprise computer-executable instructions for causing the vector processor to determine the required PE number based on compiler-generated metadata for the instruction block.

\* \* \* \* \*